Figure 1:
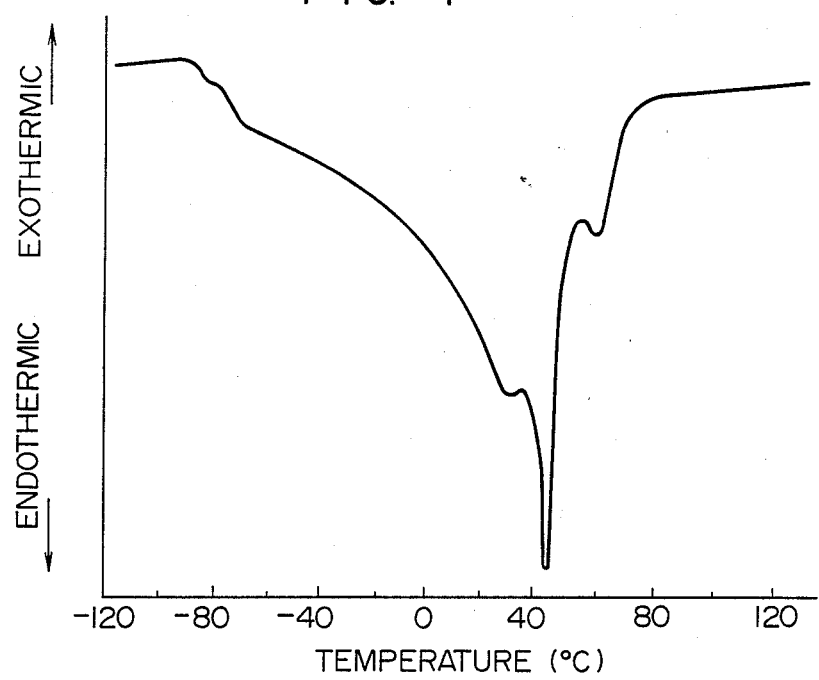

United States Patent [19]

Hattori et al.

[11] Patent Number: 4,933,401

[45] Date of Patent: Jun. 12, 1990

[54] CATALYST COMPOSITION FOR POLYMERIZATION OF CONJUGATED DIENE AND PROCESS FOR PRODUCING CONJUGATED DIENE POLYMER

[75] Inventors: Iwakazu Hattori, Aichi; Noboru Shimada, Yokkaichi; Noboru Oshima, Suzuka; Mitsuhiko Sakakibara, Katsudo, all of Japan

[73] Assignee: Japan Synthetic Rubber Co., Ltd., Tokyo, Japan

[21] Appl. No.: 314,130

[22] Filed: Feb. 23, 1989

[30] Foreign Application Priority Data

Feb. 26, 1988 [JP] Japan .................................. 63-43570

[51] Int. Cl.$^5$ .............................. C08F 2/06; C08F 4/48
[52] U.S. Cl. .................................. 526/175; 526/173; 526/177; 526/180; 526/181; 526/335; 526/340; 502/153; 502/152
[58] Field of Search ............... 526/173, 175, 177, 180, 526/181, 187; 502/152, 153, 154, 155

[56] References Cited

U.S. PATENT DOCUMENTS

| | | |
|---|---|---|
| 3,992,561 | 11/1976 | Hargis et al. |
| 4,110,525 | 8/1978 | de Zarauz |
| 4,112,210 | 9/1978 | de Zarauz |
| 4,129,704 | 12/1978 | Sanchez |
| 4,148,985 | 4/1979 | de Zarauz |
| 4,148,986 | 4/1979 | deZarauz |
| 4,152,505 | 5/1979 | de Zarauz |
| 4,297,240 | 10/1981 | Bingham et al. |
| 4,302,568 | 11/1981 | Bingham et al. |
| 4,307,218 | 12/1981 | Bingham et al. |
| 4,424,322 | 1/1984 | Hattori et al. .................. 526/173 X |

FOREIGN PATENT DOCUMENTS

| | | | |
|---|---|---|---|
| 0234512 | 9/1987 | European Pat. Off. | |
| 2302311 | 2/1975 | France | 526/173 |
| 52-30543 | 8/1977 | Japan | 526/173 |
| 52-48910 | 12/1977 | Japan | 526/173 |
| 56-112916 | 9/1981 | Japan | 526/173 |
| 59-17724 | 4/1984 | Japan | 526/173 |
| 60-26406 | 6/1985 | Japan | 526/173 |
| 1525381 | 9/1978 | United Kingdom | 526/175 |

OTHER PUBLICATIONS

Polymer Sci., USSR 16, 2630–2635 (1974).
J. Macromol. Sci., Chem., A4, 885–896 (1970).
Macronol. Chem. 156, 31–38 (1972).
Polymer Sci., USSR 18, 2325–2330 (1976).

*Primary Examiner*—Joseph L. Schofer
*Assistant Examiner*—F. M. Teskin
*Attorney, Agent, or Firm*—Oblon, Spivak, McClelland, Maier & Neustadt

[57] ABSTRACT

A catalyst composition for polymerizing a conjugated diene which comprises the following (a), (b) and (c) components:

(a) an organolithium-aluminum compound represented by the formula:

$$LiAlR^1R^2R^3R^4$$

(b) an organobarium-aluminum compound represented by the formula:

$$Ba(AlR^1R^2R^3R^4)_2 \text{ or } Ba[AlR^1R^2R^3(OR^4)]_2$$

(c) a lithium alkoxide represented by the formula:

$$LiOR^5$$

The conjugated diene polymer or copolymer obtained by polymerizing a conjugated diene alone or in combination with other monomer with the above catalyst composition in an inert organic solvent has a high trans-1,4 bond content, a low vinyl bond content and a low cis-1,4 bond content.

22 Claims, 1 Drawing Sheet

CATALYST COMPOSITION FOR POLYMERIZATION OF CONJUGATED DIENE AND PROCESS FOR PRODUCING CONJUGATED DIENE POLYMER

This invention relates to a catalyst composition for polymerizing a conjugated diene and a process for producing a conjugated diene polymer using the catalyst composition More particularly, it relates to a catalyst composition consisting essentially of (a) an organolithium-aluminum compound, (b) an organobarium-aluminum compound and (c) a lithium alkoxide and a process for producing a conjugated diene polymer having a high trans-1,4 bond content and a low 1,2 or 3,4 bond (hereinafter referred to as the vinyl bond) content using the above catalyst composition.

As a result of recent increase of the performance of automobiles, an enhancement of processability, abrasion resistance, mechanical properties and the like of rubber materials for tyre and the like has recently been strongly demanded These properties cannot be sufficiently satisfied by high cis-1,4 polybutadiene obtained with a conventional Ziegler type catalyst, a low cis-1,4 polybutadiene and styrene-butadiene copolymer obtained with a lithium catalyst and a polybutadiene and styrene-butadiene copolymer obtained by emulsion polymerization.

On the other hand, besides the above polymers, a high trans-1,4 polybutadiene and styrene-butadiene copolymer are known; however, these polymers are unsatisfactory in physical properties of their vulcanizates and their production is very difficult. Therefore, these polymers cannot be practically used.

Conventional catalysts enabling one to copolymerize a conjugated diene with an aromatic alkenyl compound to produce a high trans-1,4 conjugated diene-styrene copolymer are the following alkaline earth metal-based catalysts, particularly barium-based catalysts:

(i) Catalyst comprising a barium metal as a principal component

P. Maleki et al. have reported copolymerization of styrene with 1,3-butadiene using a metallic barium suspension as a catalyst in toluene [see Makromol. Chem., 156, 31(1972)]; however, this has a problem that the polymerization activity is low.

(ii) Catalyst comprising a barium-hetero atom bond-containing compound and an organometal as principal components (a) Fujio et al. have reported copolymerization of styrene with 1,3-butadiene using, as a polymerization catalyst, n-butyllithium (hereinafter referred to as n-BuLi), $Ba(OC_2H_5)_2$ or

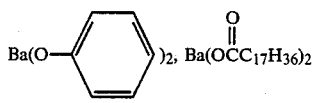

or the like [see Journal of the Chemical Society of Japan [Pure Chemistry Section], 447(1972)]; however, the trans-1,4 bond content is about 70% which is unsatisfactorily low.

(b) Z. M. Baidakova et al. have reported as an example of use of a polymerization catalyst comprising a barium alkoxide and an organometal, the polymerization of 1,3-butadiene with a catalyst of a $(C_2H_5)_2Mg/Ba(OC_2H_5)_2$ system, a $(C_4H_9)_3MgI/$-$Ba(OC_2H_5)_2$/diphenylethylene system or a (n-$C_6OC_{13})_2$/diphenylethylene system [see Polymer Sci., USSR, 18, 2325(1976)]; however, the polymerization activity is too low.

(c) Japanese Patent Application Kokoku No. 48,910/77 discloses copolymerization of styrene with 1,3-butadiene with a polymerization catalyst consisting of a barium tertiary alkoxide and dibutylmagnesium; however, the activity is also low in this reaction.

(d) Japanese Patent Application Kokoku No. 45,401/81 discloses copolymerization of styrene with 1,3-butadiene with a polymerization catalyst consisting of an organolithium and a barium compound represented by the formula:

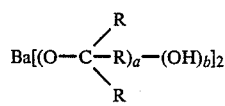

wherein three R's may be the same or different and at least one R is methyl or cyclohexyl and the remaining R or R's are selected from alkyl groups having 1-6 carbon atoms and cyclohexyl, and the a/b molar ratio is about 97.5/2.5-90/10; however, it is very complicated to introduce the -OH group into the barium compound and the trans-1,4 bond content is about 80% which is too low in practice.

(e) Japanese Patent Application Kokoku No. 35,401/87 discloses a catlyst system consisting of a barium alkoxide, a trialkylaluminum and a dialkylmagnesium; however, the preparation of the barium compound is very difficult and there is a problem that the polymerization activity is unsatisfactory.

(f) Japanese Patent Application Kokoku No. 30,543/77 discloses copolymerization of styrene with 1,3-butadiene using an organolithium, a barium compound and an organoaluminum compound as polymerization catalyst. However, in order to make the trans-1,4 bond content realtively high, it is necessary to increase the amount of the organoaluminum compound used, and the polymer thus obtained has a lowered molecular weight and the proportion of the copolymerized styrene is also lowered.

(g) Tsuruta et al. have reported copolymerization of styrene with 1,3-butadiene with a catalyst consisting of $R(CH_2CH_2O)_nLi/n$-BuLi or $(CH_3)_2NCH_2CH_2Li/n$-BuLi [see Journal of the Chemical Society of Japan [Industrial Chemistry Section], 72, 994(1969) and J. Macromol. Sci. Chem., A4, 885(1970)].

Also, Japanese Patent Application Kokoku No. 34,843/82 discloses copolymerization of styrene with butadiene and polymerization of butadiene with a catalyst of a barium compound/lithium compound/organolithium compound/lithium alkoxide system as a result of combination of the above-mentioned Tsuruta et al.'s knowledge with a knowledge from Japanese Patent Application Kokoku No. 30,543/77.

(h) Japanese Patent Application Kokoku No. 26,406/85 discloses copolymerization of styrene with butadiene with a catalyst of a barium compound/organolithium-magnesium compound/organolithium compound/organoaluminum compound system. However, the trans-1,4 bond content is low and the molecular weight is also low.

(i) Japanese Patent Application Kokai No. 112,916/81 discloses polymerization of butadiene with a catalyst of a compound system; however, the molecular weight is difficult to increase.

(iii) Catalyst comprising ate complex of barium as principal component (a') Fujio et al. have reported copolymerization of butadiene with styrene with a polymerizataion catalyst consisting of an ate complex such as tetrabutyl-barium-zinc [BaZn(C₄H₉)₄] or the like [see Journal of the Chemical Society of Japan [Pure Chemistry Section], 440(1972)] and Z. M. Baidakova et al. have reported copolymerization of butadiene with styrene with a catalyst consisting of an ate complex such as Ba-[Al(C₂H₅)₄]₂ or the like in a hydrocarbon or a solvent for electron donor [see Polymer Sci., USSR, 16, 2630(1974)]. In the former, the trans-1,4 bond content is about 70% which is too low, and in the latter, the polymerization rate is unsatisfactorily low and the polymerization conversion is low, namely 75% when the reaction is conducted at 50° C. for 100 hours.

(b') Japanese Patent Application Kokoku No. 2,323/85 discloses polymerization of butadiene with a catalyst of an organobarium-aluminum compound(ate complex)/electron donor system as in the above-mentioned method of Z. M. Baidakova et al. However, the polymerization activity is still low and the method cannot be used in practice.

(c') Japanese Patent Application Kokoku No. 17,724/84 discloses polymerization of butadiene with a catalyst of an organolitium compound/organobarium-aluminum compound(ate complex) system; however, the trans-1,4 bond content is low, namely 80% or less and the control of trans-1,4 bond content is not easy.

As discussed above, there are many proposals concerning polymerization of a conjugated diene with a catalyst comprising a barium compound as a principal component. However, there are various problems that the polymerization activity is low, the trans-1,4 bond content is low, the control of melting point of crystal is difficult and the control of molecular weight is difficult.

The inventors of this invention have made extensive reserch to solve the above-mentioned problems to find that when a combination of a specific organolithium-aluminum compound, a specific organobarium-aluminum compound and a specific lithium compound is used as the polymerization catalyst, a conjugated diene polymer having a high trans-1,4 bond content can be produced, and according to this process, the control of the trans-1,4 bond content is easy and the polymerization activity is high and the control of molecular weight is also easy.

An object of this invention is to provide a polymerization catalyst for polymerizing a conjugated diene having a high trans-1,4 bond content which is easily controlable.

Another object of this invention is to provided a process for producing a conjugated diene polymer having a high trans-1,4 bond content with the above catalyst.

Figure 2:
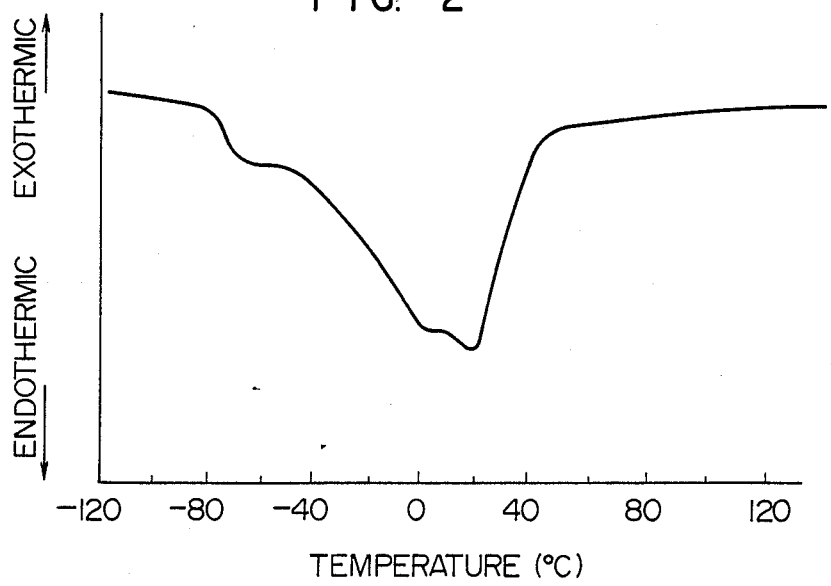

Other objects and advantages of this invention will become apparent from the following description and the accompanying drawings, in which FIG. 1 shows DSC curve of polymer obtained in Example 1 which appears hereinafter and FIG. 2 shows DSC curve of polymer obtained in Example 4 which appears hereinafter.

According to this invention, there is provided a catalyst composition for polymerizing a conjugated diene which consists essentially of the following (a), (b) and (c) components:

(a) an organolithium-aluminum compound represented by the general formula:

$$LiAlR^1R^2R^3R^4$$

wherein $R^1$–$R^4$, which may be the same or different, represent alkyl groups having 1 to 20 carbon atoms or aryl groups, (b) an organobarium-aluminum compound represented by the general formula:

$$Ba(AlR^1R^2R^3R^4)_2 \text{ or } Ba[AlR^1R^2R^3(OR^4)]_2$$

wherein $R^1$–$R^4$ have the same meanings as defined above, (c) a lithium alkoxide represented by the formula:

$$LiOR^5$$

wherein $R^5$ represents an alkyl group having 1 to 20 carbon atoms, an aryl group or a hydrocarbon group containing at least one hetero atom selected from the group consisting of oxygen and nitrogen atoms.

This invention further provides a process for producing a conjugated diene polymer by polymerizing a conjugated diene or a monomer mixture comprising the same with the above-mentioned catalyst composition in an inert organic solvent.

The catalyst composition of this invention comprises as the essential components (a) the specific organolithium-aluminum compound (ate complex) (hereinafter referred to as (a) component), (b) the specific organobarium-aluminum compound (ate complex) (hereinafter referred to as the (b) component) and (c) the specific lithium alkoxide (hereinafter referred to as the (c) component).

The (a) component(organolithium-aluminum compound) is synthesized by reacting an organolithium compound with a trialkylaluminum.

The organolithium compound used in the above reaction includes ethyllithium, propyllithium, n-butyllithium, sec-butyllithium, t-butyllithium, hexyllithium, 1,4-dilithiobutane, a reaction product of butyllithium with divinylbenzene, alkylenedilithiums, phenyllithium, stylbenedilithium, isopropenylbenzenedilithium, lithiumnaphthalene and the like.

Also, the trialkylaluminum used in the above reaction includes specifically trimethylaluminum, triethylaluminum, triisopropylaluminum, tributylaluminum, triisobutylaluminum, trihexylaluminum, tricyclohexylaluminum and the like.

The amount of the trialkylaluminum used is 0.8–1.5 moles, preferably 1 mole per mole of the organolithium compound. In such amounts, the two are reacted with each other in an organic solvent such as cyclohexane, tetrahydrofuran or the like to synthesize the organolithium-aluminum compound (ate complex).

The above reaction can be effected at a temperature of −80° to 120° C., preferably −20° to 100° C., preferably under an inert atmosphere such as nitrogen gas.

The organobarium-aluminum compound which is the (b) component can be synthesized by reacting a barium compound with a trialkylaluminum by, for example, the Lehmkhol et al. method [see Ann. 705, 42(1967)].

The barium compound includes specifically barium dimethoxide, barium diethoxide, barium diisopropoxide, barium di-n-butoxide, barium di-sec-butoxide, barium t-butoxide, barium di(1,1-dimethylpropoxide), barium di(1,2-dimethylpropoxide), barium di(1,1-dimethylbutoxide), barium di(1,1-dimethylpentoxide), barium di(2-ethylhexanoxide), barium di(1-methylheptoxide), barium diphenoxide, barium di(p-methylphenoxide), barium di(p-octylphenoxide), barium di(p-nonylphenoxide), barium di(p-dodecylphenoxide), barium di(α-naphthoxide), barium di(β-naphthoxide), barium (o-methoxyphenoxide), barium (o-methoxyphenoxide), barium di(m-methoxyphenoxide), barium di(p-methoxyphenoxide), barium (o-ethoxyphenoxide), barium (4-methoxy-1-naphthoxide) and the like.

The trialkylaluminum includes those mentioned as to the synthesis of the ate complex which is the (a) component.

The barium compound and the trialkylaluminum are subjected to the reaction in a proportion of 2 to 6 moles, preferably 2.5 to 5.0 moles, of the latter per mole of the former in an organic solvent such as cyclohexane, tetrahydrofuran or the like, to synthesize the organobarium-aluminum compound (ate complex). Also, the reaction is effected at a temperature of −80° to 120° C., preferably −20° to 100° C., preferably under an inert atmosphere such as nitrogen gas.

The (c) component, a lithium alkoxide, can be synthesized by reacting an organolithium compound, metallic lithium or lithium hydride with an alcohol. The lithium compound is preferably represented by at least one of the following formulas:

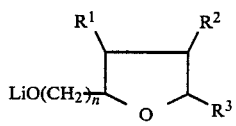

wherein $R^1$ to $R^3$ have the same meanings as defined above and n is an integer of 1 to 3,

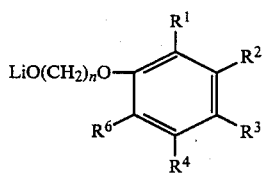

wherein $R^1$ to $R^4$ have the same meanings as defined above, $R^6$ has the same defintion as that of $R^1$ to $R^4$ and n has the same meaning as defined above,

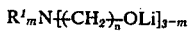

wherein m is 1 or 1 and $R^1$ and n have the same meanings as defined above,

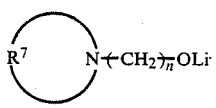

wherein n has the same meaning as defined above and $R^7$ represents an alkylene group having 3 to 30 carbon atoms,

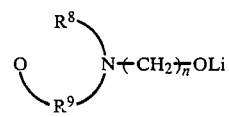

wherein n has the same meaning as defined above and $R^8$ and $R^9$ represent alkylene groups having 2 to 5 carbon atoms,

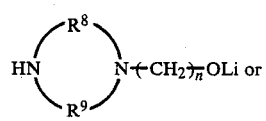

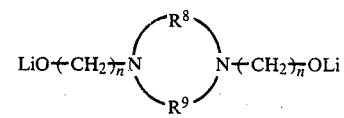

wherein n has the same meaning as defined above and $R^8$ and $R^9$ have the same meanings as defined above,

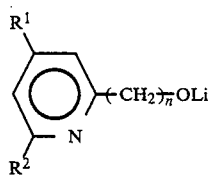

wherein $R^1$, $R^2$ and n have the same meanings as defined above.

The organolithium compound used in the synthesis of the (c) component includes those mentioned as to the organolithium compound used in the synthesis of the (a) component.

The alcohol includes specifically t-butanol, sec-butanol, cyclohexanol, octanol, 2-ethylhexanol, p-cresol, m-cresol, nonylphenol, hexylphenol, tetrahydrofuryl alcohol, furfuryl alcohol, 3-methyltetrahydrofurfuryl alcohol, oligomer of tetrahydrofurfuryl alcohol, ethylene glycol monophenyl ether, ethylene glycol monobutyl ether, N,N-dimethylethanolamine, N,N-diethylethanolamine, N,N-dibutylethanolamine, N,N-diphenylethanolamine, N-methyldiethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1-(2-hydroxyethyl)pyrrolidine, 1-piperidineethanol, 2-phenyl-1-piperidineethanol, 2-ethyl-1-piperidinepropanol, N-β-hydroxyethylmorpholine, 2-ethyl-N-8-hydroxyethylmorpholine, 1-piperazineethanol, 1-piperazinepropanol, N,N'-bis(β-hydroxyethyl)piperazine, N,N'-bis(Y-hydroxypropyl)piperazine, 2-(β-hydroxyethyl)pyridine, 2-(γ-hydroxypropyl)pyridine and the like.

The organolithium compound, metallic lithium or lithium hydride can be reacted with the alcohol in a proportion of 0.5–1.5 equivalents of the hydroxyl group of the alcohol per lithium atom, preferably in an equimolar proportion in an organic solvent such as cyclohexane, tetrahydrofuran or the like to synthesize the lithium compound. This reaction is effected at a temperature of −80° to 100° C., preferably −20° to 100° C., preferably under an inert atmosphere such as nitrogen gas.

The proportions of the components in the catalyst composition of this invention are such that the (a) component/the (b) component molar ratio is preferably 2.5-5.0, more preferably 3.0-4.5 and the (a) component/the (c) component molar ratio is preferably 0.5-10.0, more preferably 1.0-6.0. When the (a)/(b) molar ratio is less than 2.5, the polymerization activity becomes low and when it exceeds 5.0, the trans-1,4 bond content of the polymer obtained becomes low. When the (a)/(c) molar ratio is less than 0.5, the polymerization activity becomes low and when it exceeds 10.0, the trans-1,4 bond content of the polymer obtained becomes low in some cases.

Moreover, the amount of the catalyst of this invention used is usually 0.05-4.0 millimoles, preferably 0.1-3.0 millimoles, per 100 g of the monomer or monomer mixture used.

When the catalyst is prepared, a conjugated diene may, if necessary, be added as another catalyst component to a mixture of the (a), (b) and (c) components in a proportion of 0.05-20 moles per mole of the (b) component. The conjugated diene as an additional catalyst component may be the same as the monomer to be polymerized, such as isoprene, 1,3-butadiene, 1,3-pentadiene or the like. The conjugated diene as another catalyst component is not essential; however, the use of the conjugated diene compound results in a further enhancement of the catalyst activity of the catalyst components.

When preparing the catalyst, for example, the (a), (b) and (c) components dissolved in an organic solvent are subjected together with the optional conjugated diene to reaction. In this case, the order of the addition of each component is not critical. These components are preferably previously mixed, and then subjected to reaction and curing in order to enhance the polymerization activity and shorten the initiation induction period; however, the catalyst components may be successively added directly to the monomers when the monomers are polymerized.

The conjugated dienes which can be polymerized with the catalyst composition of this invention may be 1,3-butadiene, isoprene, 2,3-dimethyl-1,3-butadiene, 1,3-pentadiene, myrcene and the like. These may be used alone or in admixture of two or more. Particularly, 1,3-butadiene and/or isoprene are preferred.

The conjugated diene monomer can be copolymerized with an alkenyl compound, for example, an alkenyl aromatic compound such as styrene, α-methylstyrene, p-methylstyrene, o-methylstyrene, p-butylstyrene, vinylnaphthalene or the like; vinylpyridine; acrylonitrile; methacrylonitrile; methyl methacrylate; an acrylate; or the like. The alkenyl aromatic compound is preferable and styrene is the most preferable.

The polymerization solvent is an inert organic solvent which includes, for example, aromatic hydrocarbons such as benzene, toluene, xylene and the like; aliphatic hydrocarbons such as n-pentane, n-hexane, n-butane, cyclohexane and the like; alicyclic hydrocarbons such as methylcyclopentane, cyclohexane and the like; and mixtures thereof.

The polymerization temperature is usually −20° to 150° C., preferably 30° to 120° C., and the polymerization may be batchwise or continuous.

The monomer concentration in the solvent is usually 5 to 50% by weight, preferably 10 to 35% by weight.

Furthermore, it is necessary to pay attention to avoid the incorporation of a compound having a deactivating action such as oxygen, water, carbon dioxide gas into the polymerization system as much as possible in the production of the conjugated diene polymer in order for the catalyst composition and the resulting polymer not to be deactivated.

In this invention, a conjugated diene polymer or copolymer can be produced by homopolymerizing a conjugated diene or copolymerizing a conjugated diene with an alkenyl aromatic hydrocarbon such as styrene or the like with the catalyst composition comprising the (a), (b) and (c) components in an inert organic solvent.

The conjugated diene polymer or copolymer thus obtained has a trans-1,4 bond content in the diene portion of 70 to 90%, prefrably 75 to 87% and a vinyl bond content of 4 to 11%, preferably 5 to 9% by weight, and when an alkenyl aromatic compound is copolymerized, the content thereof in the copolymer is not more than 50% by weight, preferably 4 to 45% by weight, more preferably 10 to 35% by weight. In addition, when the alkenyl aromatic compound is styrene, it is preferable that the styrene chain be random.

When the trans-1,4 bond content in the diene portion of the conjugated diene polymer or copolymer is less than 70% by weight, the polymer or copolymer is inferior in tensile strength and abrasion resistance, while when it exceeds 90%, the polymer or copolymer becomes resinous, and hence the hardness becomes high and the physical properties of vulcanized rubber become inferior.

Also, when the vinyl bond content of the polymer or copolymer is less than 4%, it is technically difficult to produce such a polymer, while when it exceeds 10%, the polymer or copolymer becomes inferior in tensile strength and abrasion resistance.

Further, the bound alkenyl aromatic compound content in the polymer or copolymer produced is preferably 4 to 45% by weight in view of the tensile strength and impact resillience of vulcanized rubber.

When styrene is copolymerized with the conjugated diene, the styrene chain in the copolymer produced is random, and the block polystyrene content as measured by the I. M. Kolthoff et al. oxidative decomposition method [see J. Polym. Sci., 1, 429(1946)] is not more than 10% by weight, preferably not more than 5% by weight in the copolymer, and when the long chain block polystyrene content exceeds 10% by weight, the impact resillience of the vulcanizate becomes low.

The trans-1,4 bond content in the diene portion of the conjugated diene polymer or copolymer produced by the process of this invention is great, because the crystal melting point determined by a differential scanning calorimetric analysis is high.

The molecular weight of the conjugated diene polymer or copolymer obtained by the process of this invention can be varied in a wide range, and the polystyrene-reduced weight average molecular weight thereof is usually $5 \times 10^4$ to $100 \times 10^4$, preferably $10 \times 10^4$ to $80 \times 10^4$. When it is less than $5 \times 10^4$, the tensile strength, abrasion resistance, impact resillience and heat-build up of vulcanized rubber are inferior, while when it exceeds $100 \times 10^4$, the processability becomes inferior and a torque is too greatly applied to the polymer when it is kneaded on roll or by a Banbury mixer and the compound comes to have a high temperature and degradation is caused. Also, dispersion of carbon black in the polymer or copolymer becomes bad and the performance of the vulcanized rubber becomes inferior.

The conjugated diene polymer or copolymer obtained by the process of this invention has a Mooney viscosity ($ML_{1+4}$, 100° C.) is usually 20 to 150, preferably 30 to 80 particularly when it is used as an industrial rubber article, and when the Mooney viscosity is less than 20, the physical properties of vulcanized rubber become inferior for the same reason as mentioned as to the weight average molecuar weight, and when it exceeds 150 the processability becomes inferior.

The conjugated diene polymer or copolymer obtained by the process of this invention can be compounded alone or after being blended with other synthetic rubbers or natural rubbers, as a raw rubber and if necessary extended with a process oil and then mixed with carbon black which is a filler, a vulcanizing agent and a vulcanization accelerator to form a rubber composition. This rubber composition is vulcanized and then used in the rubber fields requiring mechanical characteristics and abrasion resistance.

This invention is explained in more detail below referring to Examples, which are not by way of limitation but by way of illustration.

In the Examples, various measurements were conducted by the following methods:

The microstructure of the conjugated diene polymer was determined by an infrared spectroscopic analysis (Morero method).

The crystal melting point [Tm] of the conjugated diene polymer was measured by a differential scanning calorimeter (DSC).

As the differential scanning calorimeter, there was used 910 type differential scanning calorimeter manufactured by DuPont in U.S.A. As the recorder, there was used 990 type thermal analyzer manufactured by DuPont. The amount of sample was 10.0 mg±0.1 mg and 10.15 mg of α-alumina (standard sample for DSC, manufactured by Shimazu Seisakusho) was used on the reference side. The measurement was conducted by placing the sample and the reference in an aluminum pan (manufactured by DuPont), setting the resulting assembly on the DSC, heating it to +180° C., thereafter cooling it to −100° C. at a rate of 10° C. per minute and then analyzing it at a heating rate of 20° C. per minute at a sensitivity of 2mV/cm.

The Mooney viscosity was measured according to JIS K6300 under the conditions that preheating was conducted for 1 minute, measurement was conducted for 4 minutes and the temperature was 100° C.

EXAMPLE 1

Preparation of catalyst component (a)

In a 300-ml flask was placed 100 ml of cyclohexane under a dry nitrogen atmosphere, and thereto was added 10 ml of a 1.0 mole/liter cyclohexane solution of triethylaluminum.

Subsequently, 6.3 ml of a 1.6 mole/liter n-hexane solution of n-butyllithium was dropped into the resulting mixture while cooling it in an ice bath, and the resulting mixture was allowed to stand for 30 minutes. The white powder produced was washed with cyclohexane and then dried.

The powdery lithium obtained had a lithium atom/aluminum atom ratio of approximately 1/1.

Preparation of catalyst component (b)-1

In the same flask as above, 10 ml of 1.0 mole/liter toluene solution of barium nonylphenoxide was added to 100 ml of cyclohexane.

Subsequently, 40 ml of 1.0 mole/liter cyclohexane solution of triethylaluminum was dropped into the resulting mixture while cooling it in an ice bath, after which the resulting mixture was refluxed at 80° C for 1 hour. The resulting solution was allowed to stand at −15° C. for 24 hours to crystallize the reaction product. The crystal thus obtained had a barium atom/aluminum atom ratio of approximaterly 1/1.

Preparation of catalyst component (c)-1

In the same flask as above, a 1.6 moles/liter n-butyllithium solution was dropped into a 1.0 mole/liter cyclohexane solution of tetrahydrofurfuryl alcohol, after which the concentration was adjusted to prepare a 0.5 mole/liter solution of lithium tetrahydrofurfurylalcoholate.

Polymerization of 1,3-butadiene

In an autoclave having an internal volume of 300 ml were placed 120 g of cyclohexane and 30 g of 1,3-butadiene. Subsequently, the above catalyst component (b)-1 was heated to 70° C. in cyclohexane to form a solution, and 0.27 millimole of this solution was placed in the autoclave. Subsequently, the above catalyst component (a)-1 was added in an amount of 0.81 millimole similarly.

Finally, 0.54 millimole of the above catalyst component (c)-1 was placed in the autoclave, and the resulting mixture was subjected to polymerization at 70° C. for 90 minutes.

After the completion of the reaction, di-t-butyl-p-cresol was added as an antioxidant in a proportion of 0.7 g per 100 g of the solid rubber, and the reaction product was coagulated with methanol and then dried at 40° C. under reduced pressure. The polymer yield was 98%.

The microstructure of the polybutadiene thus obtained was such that the trans-1,4 bond content was 87%, the vinyl bond content was 4% and the cis-1,4 bond content was 9%. Further, the crystal melting point [Tm] had three peaks at 62° C., 44° C. and 33° C. as measured by DSC. The DSC curve of this polymer is shown in FIG. 1.

COMPARATIVE EXAMPLES 1 TO 3

The organolithium-aluminum compound [catalyst component (a)-1] obtained in Example 1 was used alone (in Comparative Example 1), the organobarium-aluminum compound [catalyst component (b)-1] obtained in Example 1 was used alone (in Comparative Example 2) and the lithium tetrahydrofurfurylalcoholate [catalyst component (c)-1] obtained in Example 1 was used alone (in Comparative Example 3), each in the same amount as in Example 1, to conduct the polymerization of 1,3-butadiene in the same manner as in Example 1. However, no polymers were obtained with any one of the catalyst systems.

COMPARATIVE EXAMPLE 4

The organobarium-aluminum compound [catalyst component (b)-1] obtained in Example 1 and the lithium tetrafurfurylalcoholate [catalyst component (c)-1] obtained in Example 1 were used in the same amounts as in Example 1 to polymerize 1,3-butadiene in the same manner as in Example 1. However, no polymer was obtained.

COMPARATIVE EXAMPLE 5

The organolithium-aluminum compound [catalyst component (a)-1] obtained in Example 1 and the lithium tetrafurfurylalcoholate [catalyst component (c)-1] obtained in Example 1 were used in the same amounts as in Example 1 to polymerize 1,3-butadiene in the same manner as in Example 1. The polymer yield was 78%.

The microstructure of the polybutadiene obtained was such that the trans-1,4 bond content was 75%, the vinyl bond content was 16% and the cis-1,4 bond content was 27%. However, the crystal melting point [Tm] could not be observed by DSC.

COMPARATIVE EXAMPLE 6

According to the method of Japanese Patent Application Kokoku No. 34,843/82, 0.27 millimole of barium nonylphenoxide was mixed with 1.08 millimoles of triethylaluminum and the resulting mixture was aged at 80° C. for 1 hour.

The whole of the resulting solution was placed in the same autoclave as in Example 1 in which 30 g of 1,3-butadiene and 120 g of cyclohexane had already been placed, and then, 0.81 millimole of n-butyllithium and 0.54 millimile of the lithium salt of diethylene glycol monoethyl ether were added thereto, after which the resulting mixture was subjected to polymerization at 70° C. for 90 minutes. The polymer yield was 82%.

The microstructure of the polybutadiene obtained was such that the trans-1,4 bond content was 82%, the vinyl bond content was 7% and the cis-1,4 bond content was 11%, and the crystal melting point [Tm] determined by DSC was 15° C.

In Comparative Example 6, the same catalyst components as in Example 1 were used; however, the polymer yield and the trans-1,4 bond content were both low in Comparative Example 6 as compared with Example 1.

COMPARATIVE EXAMPLE 7

The same procedure as in Example 6 was repeated, except that the catalyst components were 0.27 millimole of barium nonylphenoxide, 1.35 millimoles of triethylaluminum, 0.81 millimole of n-butyllithium and 0.54 millimole of the lithium salt of diethylene glycol monoethyl ether which corresponded to those in Example 1, to polymerize 1,3-butadiene. The polymer yield was 75%.

The microstructure of the polybutadiene obtained was such that the trans-1,4 bond content was 82%, the vinyl bond content was 7% and the cis-1,4 bond content was 11%, and the crystal melting point [Tm] determined by DSC was 14° C.

COMPARATIVE EXAMPLE 8

With 0.27 millimole of barium nonylphenoxide was mixed 0.81 millimole of n-butyllithim, and the resulting mixture was aged at 80° C. for 1 hour. The whole of the resulting solution was placed in the same autoclave as in Example 1 in which 30 g of 1,3-butadiene and 120 g of cyclohexane had already been placed, and the resulting mixture was subjected to polymerization at 70° C. for 2 hours. The polymer yield was 83%.

The microstructure of the polybutadiene obtained was such that the trans-1,4 bond content was 45%, the vinyl bond content was 15% and the cis-1,4 bond content was 4%, and the crystal melting point [Tm] could not be observed by DSC.

From the results in Example 1 and Comparative Examples 1 to 8, it can be seen that the catalyst composition of this invention comprising the (a), (b) and (c) components is specific to make the trans-1,4 bond content high and make the activity high.

EXAMPLE 2

In the same autoclave as in Example 1 was placed 120 g of cyclohexane, after which 0.81 millimole of n-butyllithium and 0.81 millimole of triethylaluminum were placed therein and the resulting mixture was subjected to reaction to synthesize $LiAl(C_2H_5)_3(n-C_4H_9)$.

Subsequently, in the above autoclave was placed a solution of $Ba[Al(C_2H_5)_3(OC_2H_4-C_9H_{19}(_2$ synthesized in another vessel by ageing 0.27 millimole of barium nonylphenoxide and 0.54 millimole of triethylaluminum at 80° C. for 1 hour. Furthermore, 30 g of 1,3-butadiene was added to the resulting mixture, and the temperature thereof was elevated to 70° C., after which 0.54 millimole of lithium tetrahydrofurfurylalcoholate was added thereto. The resulting mixture was subjected to polymerization for 1 hour. The polymer yield was 95%.

The microstructure of the polybutadiene obtained was such that the trans-1,4 bond content was 86%, the vinyl bond content was 5% and the cis-1,4 bond content was 9%, and the crystal melting point [Tm] had two peaks at 40° C. and 27° C. as measured by DSC.

COMPARATIVE EXAMPLES 9

The same procedure as in Example 1 was repeated, except that 1.70 millimoles of barium nonylphenoxide, 6.80 millimoles of triethylaluminum, 5.10 millimoles of n-butyllithium and 3.40 millimoles of the lithium salt of diethylaminoethanol were used as the catalyst components, to copolymerize styrene with 1,3-butadiene. The copolymer yield was 62%.

The result of analysis of the styrene-butadiene copolymer obtained are as shown in Table 1.

EXAMPLE 3

In a reactor having an internal volume of 5 liters provied with a stirrer and a jacket which had been purged with nitrogen were placed 2,000 g of previously purified and dried cyclohexane and 500 g of 1,3-butadiene.

A solution of the ate complex synthesized in another vessel by ageing 1.68 millimoles of barium nonylphenoxide and 3.36 millimoles of triethylaluminum at 80° C for 1 hour was placed in the above reactor.

Moreover, a solution of the ate complex synthesized in another vessel by ageing 5.05 millimoles of n-butyllithium and 5.05 millimoles of triethylaluminum at 80° C. for 5 minutes was placed in the above reactor, and subsequently, 3.36 millimoles of the lithium salt of ethylene glycol phenyl ether was placed therein, after which the resulting mixture was subjected to polymerization at 70° C. for 90 minutes. The polymer yield was 92%.

The results of analysis of the polybutadiene obtained are shown in Table 1.

EXAMPLE 4

The same procedure as in Example 3 was repeated, except that 100 g of styrene and 400 g of 1,3-butadiene were substituted for the 500 g of 1,3-butadiene, to effect the copolymerization. The polymer yield was 85%.

The results of analysis of the styrenebutadiene copolymer are shown in Table 1 and the DSC curve of this copolymer is shown in FIG. 2.

EXAMPLE 5

In the same manner as in Example 3, 1,3-butadiene was placed in a reactor.

A solution obtained by ageing 1.35 millimoles of barium nonylphenoxide and 5.4 millimoles of triethylaluminum at 80° C. for 1 hour in another vessel was placed in the reactor, and a solution obtained by ageing 4.05 millimoles of n-butyllithium and 4.05 millimoles of triethylaluminum at 80° C. for 5 minutes in another vessel was then placed therein. Subsequently, 2.70 millimoles of lithium tetrafurfurylalcoholate was placed therein, after which the resulting mixture was sibjected to polymerization at 90° C. for 90 minutes. The polymer yield was 90%.

The results of analysis of the polybutadiene obtained are shown in Table 1.

EXAMPLE 6

In the same reactor as in Example 3 were placed 3,000 g of the same cyclohexane as in Example 3 and 500 g of 1,3-butadiene.

Subsequently, the reactor was heated to 55° C., after which the same amount of the same polymerization catalyst as in Example 3 was placed therein to initiate the polymerization.

Thereafter, the mixture was subjected to temperature-elevating polymerization without cooling while stirring the polymerization system at 2 rpm. After 30 minutes therefrom, the temperature in the reactor reached 110° C., and the polymerization conversion of 1,3-butadiene was 84%. Thereafter, the polymerization mixture was allowed to stand for a further 30 minutes and then the polymerization was terminated. The polymer yield was 94%.

The results of analysis of the polybutadiene obtained are shown in Table 1.

COMPARATIVE EXAMPLE 10

The same procedure as in Example 6 was repeated, except that the same catalyst as in Comparative Example 6 was substituted for the catalyst in Example 6. The polymer yield was 80%. The results of analysis of the polybutadiene obtained are shown in Table 1.

Comparing Example 6 with Comparative Example 10, it can be seen that the catalyst composition containing the ate complex of this invention gives a polymer having a high trans-1,4 bond content in the tempreature-elevating polymerization which is economical in industry.

When the ate complex is not formed, the trans-1,4 bond content becomes low in the temperature-elevating polymerization, and the control of the trans-1,4 bond content becomes very difficult.

TABLE 1

|  | Comp. Ex. 9 | Example 3 | Example 4 | Example 5 | Example 6 | Comp. Ex. 10 |
|---|---|---|---|---|---|---|
| Microstructure (%) |  |  |  |  |  |  |
| Trans-1,4 | 80 | 86 | 83 | 85 | 84 | 76 |
| Vinyl | 8 | 4 | 4 | 6 | 5 | 7 |
| Cis-1,4 | 12 | 10 | 13 | 10 | 11 | 17 |
| Bound styrene (wt %) | 7 | 0 | 9 | 0 | 0 | 0 |
| Crystal melting point (°C.) | 6 | 41, 28 | 20 | 33 | 27 | −23 |
| Moony viscosity | 38 | 42 | 45 | 46 | 50 | 45 |

EXAMPLES 7 to 13

The same procedure as in Example 2 was repeated, except that one of the alkoxides shown in Table 2 was substituted for the lithium tetrahydrofurfurylalcoholate to polymerize 1,3-butadiene. The results obtained are shown in Table 2.

TABLE 2

|  | Ex. 7 | Ex. 8 | Ex. 9 | Ex. 10 |
|---|---|---|---|---|
| Alkoxide |  |  |  |  |
| Kind | CH$_3$N(CH$_2$CH$_2$OLi)$_2$ | HN⟨ ⟩NCH$_2$CH$_2$OLi | ⟨ ⟩NCH$_2$CH$_2$OLi | O⟨ ⟩NCH$_2$CH$_2$OLi |
| Molar ratio to barium metal | 1.0 | 2.0 | 2.0 | 2.0 |
| Converion of 1,3-butadiene | 100 | 100 | 100 | 100 |
| Microstructure |  |  |  |  |
| Trans-1,4 (%) | 87 | 87 | 86 | 85 |
| Vinyl (%) | 5 | 5 | 6 | 6 |
| Cis-1,4 (%) | 8 | 8 | 8 | 9 |
| Crystal melting point (°C.) | 45, 32 | 46, 31 | 40, 27 | 34 |

|  | Ex. 11 | Ex. 12 | Ex. 13 |
|---|---|---|---|
| Alkoxide |  |  |  |
| Kind | ⟨ ⟩NCH$_2$CH$_2$OLi | ⟨ ⟩NCH$_2$CH$_2$CH$_2$OLi | pyridyl-CH$_2$CH$_2$OLi |
| Molar ratio to | 2.0 | 2.0 | 2.0 |

TABLE 2-continued

| | | | |
|---|---|---|---|
| barium metal | | | |
| Converion of 1,3-butadiene | 100 | 100 | 100 |
| Microstructure | | | |
| Trans-1,4 (%) | 85 | 84 | 83 |
| Vinyl (%) | 6 | 6 | 6 |
| Cis-1,4 (%) | 9 | 10 | 11 |
| Crystal melting point (°C.) | 33 | 26 | 21 |

What is claimed is:

1. A catalyst composition for polymerizing a conjuagted diene which consists essentially of the following (a), (b) and (c) components: (a) an organolithium-aluminum compound represented by the formula:

$$LiAlR^1R^2R^3R^4$$

wherein $R^1$ to $R^4$, which may be the same or different, represent alkyl groups having 1 to 20 carbon atoms or aryl groups, (b) an organobarium-aluminum compound represented by the formula:

$$Ba(AlR^1R^2R^3R^4)_2 \text{ or } Ba[AlR^1R^2R^3(OR^4)]_2$$

wherein $R^1$ to $R^4$ have the same meanings as defined above, (c) a lithium alkoxide represented by the formula:

$$LiOR^5$$

wherein $R^5$ represents an alkyl group having 1 to 20 carbon atoms, an aryl group or a hydrocarbon group containing at least one hetero atom selected from the group consisting of oxygen and nitrogen atoms.

2. The catalyst composition according to claim 1, wherein the (a) component, organolithium-aluminum compound, is a reaction product of an organolithium compound with a trialkylaluminum.

3. The catalyst composition according to claim 2, wherein the organolithium compound is ethyllithium, propyllithium, n-butyllithium, sec-butyllithium, t-butyllithium, hexyllithium, 1,4-dilithiobutane, a reaction product of butyllithium with divinylbenzene, an alkylenedilithium, phenyllithium, stylbenedilithium, isopropenylbenzenedilithium or lithiumnaphthalene.

4. The catalyst composition according to claim 2, wherein the trialkylaluminum is trimethylaluminum, triethylaluminum, triisopropylaluminum, tributylaluminum, triisobutylaluminum, trihexylaluminum, tricyclohexylaluminum, triisobutylaluminum, trihexylaluminum or tricyclohexylaluminum.

5. The catalyst composition according to claim 2, wherein the amounts of the organolithium compound and the trialkylaluminum are 0.8-1.5 moles of the trialkylaluminum per mole of the organolithium compound.

6. The catalyst composition according to claim 1, wherein the (b) component, organobarium-aluminum compound, is a reaction product of a barium compound with a trialkylaluminum.

7. The catalyst composition according to claim 6, wherein the barium compound is barium ethoxide, barium diisopropoxide, barium di-n-butoxide, barium di-sec-butoxide, barium di-t-butoxide, barium di(1,1-dimethylpropoxide), barium di(1,2-dimethylpentoxide), barium di(1,1-dimethylbutoxide), barium di(1,1-dimethylpentoxide), barium di(2-ethylhexanoxide), barium di(1-methylheptoxide), barium diphenoxide, baraium di(p-methylphenoxide), barium di(p-octylphenoxide), barium di(p-nonylphenoxide), barium di(p-dodecylphenoxide), barium di(α-naphthoxide), barium di(β-naphtoxide), barium (o-methoxyphenoxide), barium di(m-methoxyphenoxide), barium di(p-methoxyphenoxide), barium (o-ethoxyphenoxide) or barium (4-methoxy-1-naphthoxide).

8. The catalyst composition according to claim 6, wherein the trialkylaluminum is trimethylaluminum, triethylaluminum, triisopropylaluminum, tributylaluminum, triisobutylaluminum, trihexylaluminum or tricyclohexylaluminum.

9. The catalyst composition according to claim 6, wherein the barium compound is reacted with the trialkylaluminum in a proportion of 2 to 6 moles of the latter per mole of the former.

10. The catalyst composition according to claim 1, wherein the (c) component, a lithium alkoxide, is a reaction product of an organolithium compound, metallic lithium or lithium hydride with an alcohol.

11. The catalyst composition according to claim 1, wherein the lithium alkoxide component (c) is a compound represented by one of the following formulas:

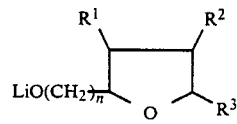

wherein $R^1$ to $R^3$ have the same meanings as defined above and n is an integer of 1 to 3,

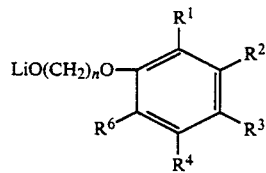

wherein $R^1$ to $R^4$ have the same meanings as defined above, $R^6$ has the same definition of that of $R^1$ and n has the same meaning as defined above, $$R^1{}_mN[(CH_2)_nOLi]_{3-m}$$

wherein m is 1 or 2 and $R^1$ and n have the same meanings as defined above,

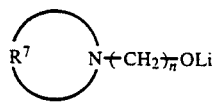

wherein n has the same meaning as defined above and R[7] represents an alkylene group having 3 to 10 carbon atoms,

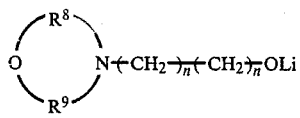

wherein n has the same menaing as defined above and R[8] and R[9] represent alkylene groups having 2 to 5 carbon atoms,

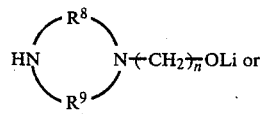

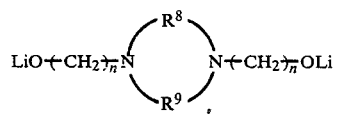

wherein n has the same meaning as defined above and R[8] and R[9] have the same meanings as above, and

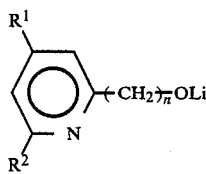

wherein R[1], R[2] and n have the same meanings as defined above.

12. The catalyst composition according to claim 1, wherein the (c) component, a lithium alkoxide, is a compound represented by the formula:

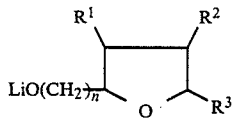

wherein R[1] to R[3] have the same meanings as defined above or

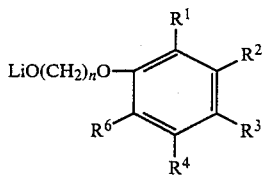

wherein R[1] to R[4], R[6] and n have the same meanings as defined above.

13. The catalyst composition according to claim 1, wherein the (a) component/the (b) component molar ratio is 2.5–5.0.

14. The catalyst composition according to claim 1, wherein the (a) component/the (b) component molar ratio is 3.0–4.5.

15. The catalyst composition according to claim 1, wherein the (a) component/the (c) component molar ratio is 0.5–10.0.

16. The catalyst composition according to claim 1, wherein the (a) component/the (c) component molar ratio is 1.0–6.0.

17. A process for producing a conjugated diene polymer or copolymer which comprises polymerizing one or more conjugated diene compound alone or in combination with at least one other alkenyl monomer in the presence of the catalyst composition of claim 1 in an inert organic solvent.

18. The process according to claim 17, wherein the conjugated diene compound is at least one member selected from the group consisting of 1,3-butadiene, isoprene, 2,3-dimethyl-1,3-butadiene, 1,3-pentadiene and myrcene and said other alkenyl monomer is at least one alkenyl aromatic compound selected from the group consisting of styrene, α-methylstyrene, p-methylstyrene, o-methylstyrene, p-butylstyrene and vinylnaphthalene.

19. The process according to claim 18, wherein the conjugated diene compound is 1,3-butadiene or isoprene and the alkenyl aromatic compound is styrene.

20. The process according to claim 17, wherein the polymerization temperature is −20° to 150° C.

21. The process according to claim 17, wherein the monomer concentration in the solvent is 5 to 50% by weight.

22. The process according to claim 17, wherein the amount of the catalyst composition is 0.05–4.0 millimoles per 100 parts by weight of the monomer or monomers.

* * * * *